United States Patent [19]

Yagi

[11] Patent Number: 4,933,953
[45] Date of Patent: Jun. 12, 1990

[54] INITIAL SYNCHRONIZATION IN SPREAD SPECTRUM RECEIVER

[75] Inventor: Hideki Yagi, Yokohama, Japan
[73] Assignee: Kabushiki Kaisha Kenwood, Tokyo, Japan
[21] Appl. No.: 239,287
[22] Filed: Sep. 1, 1988
[30] Foreign Application Priority Data
Sep. 10, 1987 [JP] Japan .................................. 62-225396
[51] Int. Cl.$^5$ ............................................. H04K 1/00
[52] U.S. Cl. ........................................................ 375/1
[58] Field of Search ............................... 375/1; 380/34
[56] References Cited
U.S. PATENT DOCUMENTS

| | | | |
|---|---|---|---|
| 4,121,159 | 10/1978 | Lampert | 375/1 |
| 4,351,064 | 9/1982 | Ewanus | 375/1 |
| 4,752,939 | 6/1988 | Amoroso et al. | 375/1 |

*Primary Examiner*—Salvatore Cangialosi
*Attorney, Agent, or Firm*—Sixbey, Friedman, Leedom & Ferguson

[57] ABSTRACT

An initial synchronization system for spread spectrum communication including a despreader-demodulator circuit for despreading and demodulating an input signal according to a despread control signal, a decoder circuit for decoding a data signal demodulated by the despreader-demodulator circuit and outputting a code synchronization signal when code synchronization is taken, a correlation detector circuit in response to the input signal for detecting the correlation of the input signal and generating the despread control signal and a correlation detection signal, and a control circuit for outputting an initial synchronization start signal to the correlation detector circuit so as to cause the correlation detector circuit to start the initial synchronization if the code synchronization signal is not generated within a predetermined period after the correlation detection signal was generated.

4 Claims, 1 Drawing Sheet

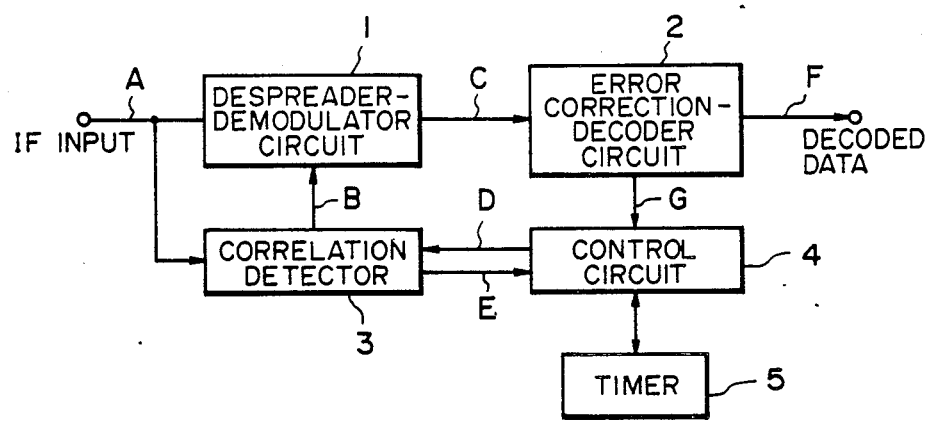
F I G. 1
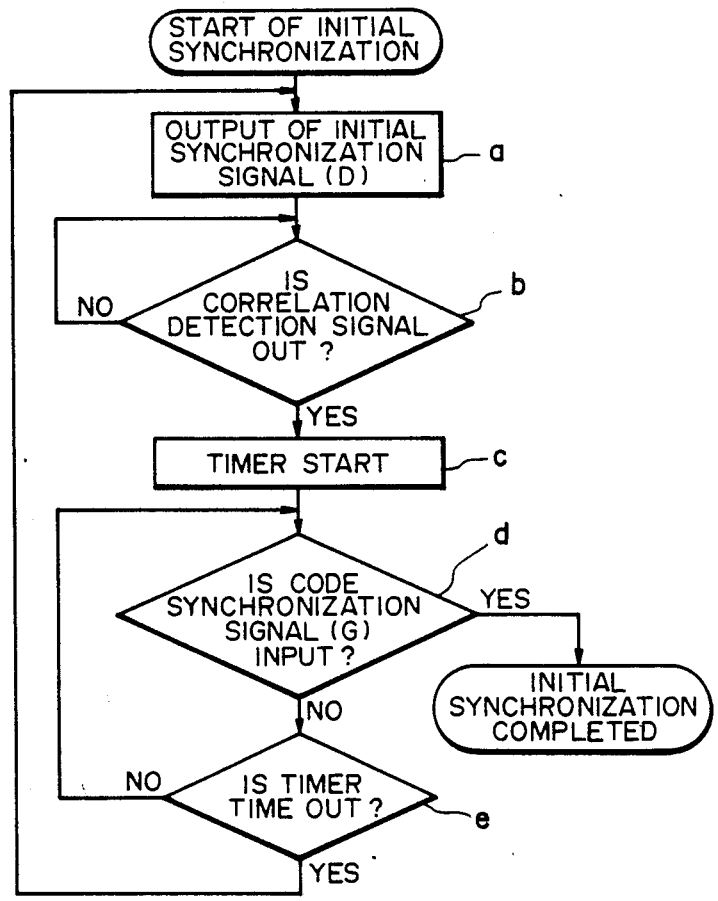
F I G. 2

INITIAL SYNCHRONIZATION IN SPREAD SPECTRUM RECEIVER

FIELD OF THE INVENTION

The present invention relates to a spread spectrum communication system and, more particularly, to an initial synchronization circuit in a receiver of that system.

CONVENTIONAL ART

The spread spectrum system includes the following systems.
(1) DS (Direct Sequence) system
(2) FH (Frequency Hopping) system
(3) TH (Time Hopping) system
(4) Pulse coding FM system
(5) Hybrid system In general, at present, the DS and FH systems are used, the TH system and pulse coding FM system are applied to the limited fields, and the hybrid system is being theoretically studied. The principle of the DS system will now be described. On the transmission side, the information signal is subjected to an ordinary modulation (primary modulation). The primary-modulated signal is then modulated by the spread pseudo noise code (PN code) of a wide band and transmitted as a wide band signal having a very small power density. This operation is called a spread modulation. On the reception side, the correlation with the received or incoming signal is derived by use of the same demodulating PN code as that on the transmission side. After the correlation was obtained, only the signal to be received is converted into the original primary-modulated signal of the narrow band. The other signals and interference signal become the wide band noises having a small power density. Only a desired signal is extracted by a filter. The primary modulation can use the analog system such as FM and the digital system such as PSK. In general, the PSK system by the pseudo noise (PN) code is used as the spread modulation.

It is required that the demodulating PN code which is generated on the reception side has the same bit constitution and the same phase as those of the PN code in the incoming or received spread spectrum signal. Therefore, the initial synchronization (synchronization trapping) is performed to made the phase of the PN code on the reception side coincide with the phase of the PN code in the incoming signal. Next, in order to keep the phase-coincident PN code on the reception side, the synchronization holding process is performed by a delay-locked loop circuit (DLL).

For an initial synchronization, the phase state of the PN code in the received signal is detected by a correlation detection circuit (PN SYNC) and the correlation detection output is used to take the initial synchronization. After the initial synchronization, the synchronization is kept by a delay-locked loop in a despreader-demodulator circuit.

In a spread spectrum communication system, it is required to conduct an initial synchronization at a high speed.

This is also true particularly for the case where a C/N ratio is degraded and the correlation outputs are being fluctuating.

It is an object of the present invention to provide an initial synchronization system for spread spectrum communication which can realize an initial synchronization at high speed even in the case where a C/N ratio is degraded and the correlation outputs are being fluctuating.

SUMMARY OF THE INVENTION

To solve the above problems, the initial synchronization system for spread spectrum communication according to the present invention comprises a despreader-demodulator circuit for despreading and demodulating an input signal according to a despread control signal, a decoder circuit for decoding a data signal demodulated by the despreader-demodulator circuit and outputting a code synchronization signal when code synchronization is taken, a correlation detector circuit in response to the input signal for detecting the correlation of the input signal and generating the despread control signal and a correlation detection signal, and a control circuit for outputting an initial synchronization start signal to the correlation detector circuit so as to cause the correlation detector circuit to start the initial synchronization if the code synchronization signal is not generated within a predetermined period after the correlation detection signal was generated.

The case where the code synchronization signal is not generated within a predetermined period after the correlation detection signal was generated corresponds to the case where the initial synchronization was not taken. For such a case, an initial synchronization start signal is again supplied to the correlation detector circuit.

The predetermined period is set slightly longer than the period required in despreading/demodulating and in code synchronization for decoding so that the initial synchronization can be taken efficiently even in the case where a C/N ratio is degraded and the correlation outputs are being fluctuating.

BRIEF DESCRIPTION OF THE DRAWINGS

FIG. 1 is a block diagram showing the circuit arrangement of an embodiment of the initial synchronization system of this invention; and FIG. 2 is a flow chart used for explaining the operation of the embodiment shown in FIG. 1.

DETAILED DESCRIPTION OF THE EMBODIMENT

FIG. 1 is a block diagram showing the circuit arrangement of the embodiment according to the present invention.

A despreader-demodulator circuit 1 starts despreading and demodulating an inputted intermediate frequency signal A upon reception of a despread control signal B, and outputs a demodulated data signal C.

A correlation detector circuit 3 starts detecting a correlation of the inputted intermediate frequency signal A upon reception of an initial synchronization start signal D, and outputs a correlation detection signal E and the despread control signal B when a correlation is detected.

An error correction decoder circuit 2 decodes the demodulated data signal C to output decoded data F, and output a code synchronization signal G when a code synchronization is taken.

A control circuit 4 causes a timer 5 to start every time the former receives the correlation detection signal E, and checks if the code synchronization signal G is generated within a predetermined period set in the timer 5.

If the code synchronization signal G is not detected within the predetermined period, the control circuit 4 generates the initial synchronization start signal D to repeat the operation to check if the code synchronization signal G is generated or not.

The operation of the embodiment of this invention constructed as above will be described with reference to the flow chart shown in FIG. 2.

As an initial synchronization is instructed to the control circuit 4, it outputs an initial synchronization start signal D to the correlation detector circuit 3 (step a). The correlation detector circuit 3 starts a correlation detection operation, and the flow waits for a detection of a correlation (step b). Upon detection of a correlation, the correlation detector circuit 3 outputs a correlation detection signal E to the control circuit 4 which in turn causes the timer 5 to start its counting operation (step c).

Simultaneously with the detection of a correlation, the correlation detector circuit 3 also outputs a despread control signal B to the despreader-demodulator circuit 1 which in turn starts despreading and demodulating an inputted intermediate frequency signal A to output a demodulated data signal C. The demodulated data signal C is decoded by the error correction decoder circuit 2 to output decoded data F. When the code synchronization is taken at the error correction decoder circuit 2, it outputs a code synchronization signal G to the control circuit 4. It is checked if the code synchronization signal G is sent to the control circuit 4 within the predetermined period set in the timer 5 (step d, e). The predetermined period set in the timer 5 is slightly longer than the period required in despreading-/demodulating and in code synchronization for decoding. As a result, if the code synchronization signal G is sent within the predetermined period set in the timer 5, it means that the initial synchronization was completed. However, if the code synchronization signal G is not sent within the predetermined period, the initial synchronization start signal D is again sent from the control circuit 4 to the correlation detector circuit 3 to return to step a for repeating the initial synchronization.

The control circuit 4 may be constructed of a microcomputer. Instead of using the code synchronization signal G outputted from the error correction decoder circuit 2, a lock signal from the despreader-demodulator circuit 1 may be used to achieve the same processing.

As appreciated from the foregoing description of this invention, it is checked if the code synchronization signal is generated within a predetermined period after a correlation detection signal was generated. If the code synchronization signal is not generated within the predetermined period, an initial synchronization start signal is again outputted to repeat the initial correlation detection operation. Therefore, even in the case where a C/N ratio is degraded and the correlation detection outputs are being fluctuating, the initial synchronization can be taken efficiently at high speed by repeating the correlation detection operation. Specifically, the predetermined period is set slightly longer than the period required in despreading/demodulating and in code synchronization for decoding so that the initial synchronization can be efficiently achieved at high speed.

Without the arrangement described as above, the despreading/demodulating and decoding are carried out even if the initial synchronization is not taken, thus resulting in man false detections.

What is claimed is:

1. An initial synchronization system for spread spectrum communication comprising:
   a despreader-demodulator circuit for despreading and demodulating an input spread spectrum signal according to a despread control signal to reproduce a data signal;
   a decoder circuit for error-correction-decoding the data signal and outputting a code synchronization signal when code synchronization is taken;
   a correlation detector circuit in response to an initial synchronization start signal for detecting the correlation of the input spread spectrum signal for an initial synchronization and generating the despread control signal and a correlation detection signal; and
   a control circuit for outputting the initial synchronization start signal to said correlation detector circuit so as to cause said correlation detector circuit to restart the initial synchronization if the code synchronization signal is not generated within a predetermined period after the correlation detection signal was generated.

2. An initial synchronization system according to claim 1 further comprising timer means provided with a timer setting period which is equal to said predetermined period.

3. An initial synchronization system according to claim 2, wherein said control circuit in response to the correlation detection signal starts said timer.

4. An initial synchronization system according to claim 1, wherein said predetermined period is set slightly longer than the interval time necessary for the despreading-demodulation in said despreader-demodulator circuit and the code synchronizing in said decoder circuit.

* * * * *